UNITED STATES PATENT OFFICE.

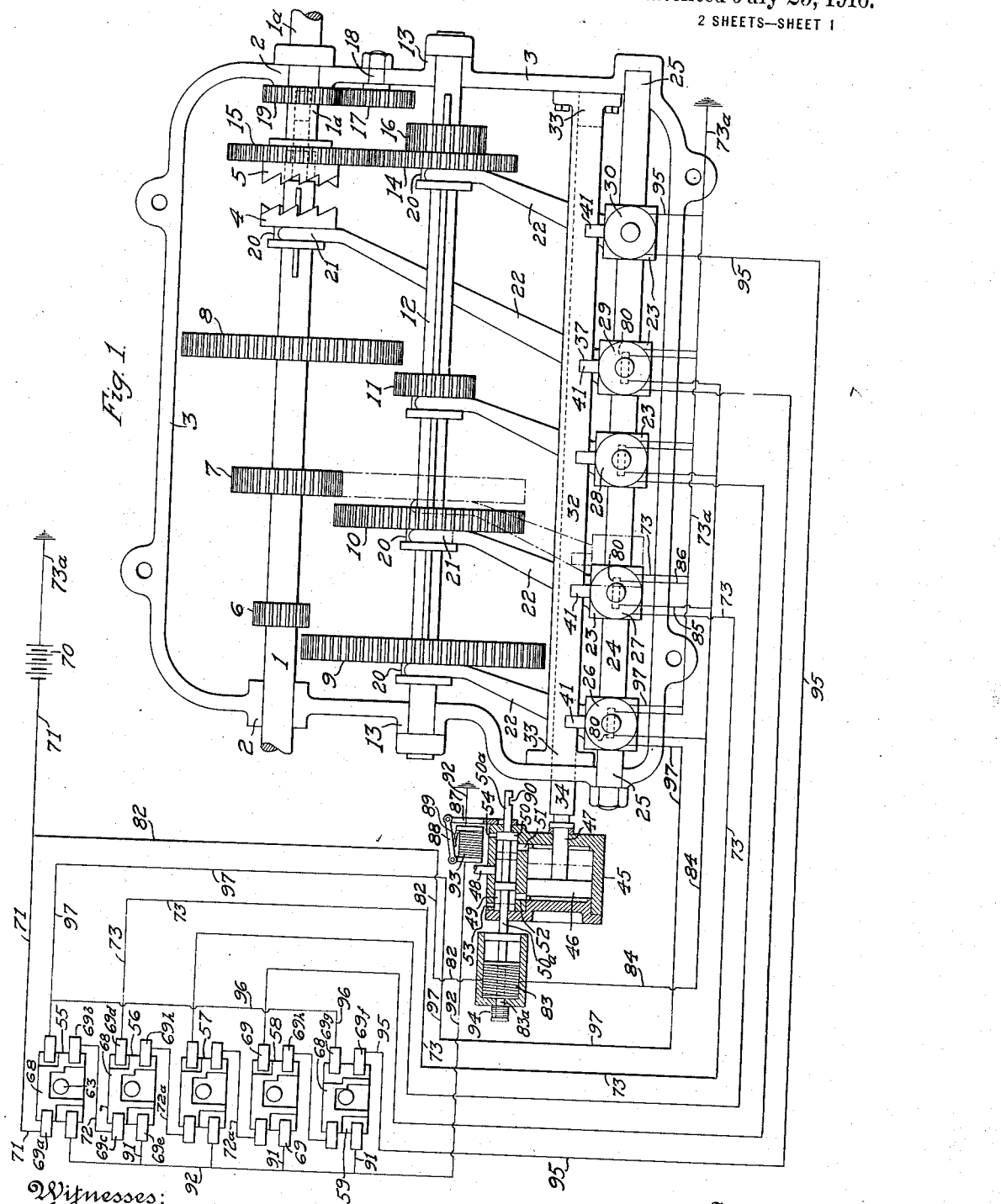

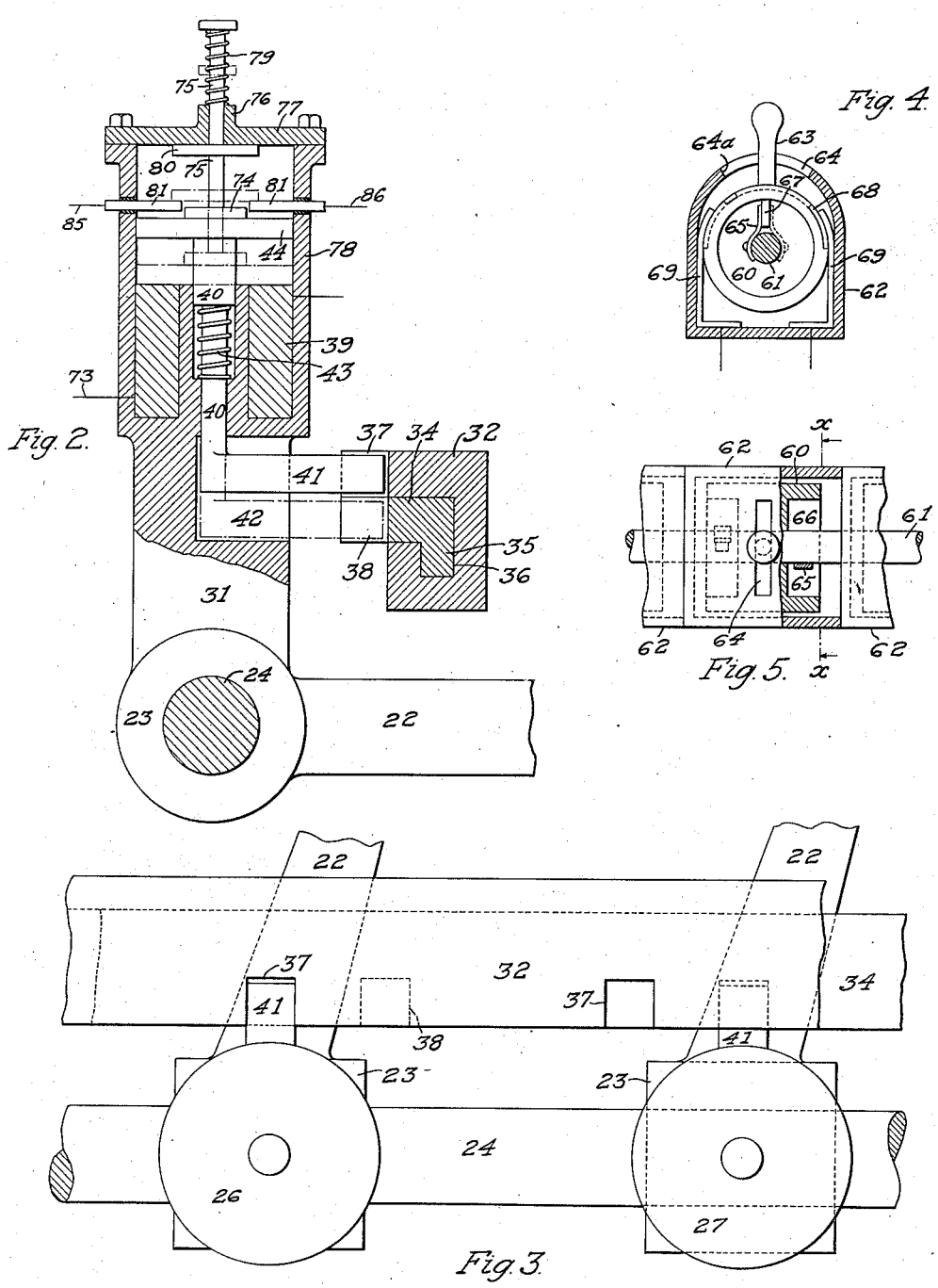

MERION J. HUGGINS, OF NEW YORK, N. Y.

SPEED-CHANGING TRANSMISSION FOR AUTOMOBILES.

1,192,427.

Specification of Letters Patent. Patented July 25, 1916.

Application filed July 3, 1913. Serial No. 777,175.

*To all whom it may concern:*

Be it known that I, MERION J. HUGGINS, a citizen of the United States, and resident of the city of New York, in the county of Kings and State of New York, have invented certain new and useful Improvements in Speed-Changing Transmission for Automobiles, of which the following is a specification.

This invention relates to automobiles, particularly to the speed changing transmission mechanism thereof, and its principal object is to provide simple, efficient, reliable, and improved means for driving the wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—Figure 1 is a plan view of the gear transmission mechanism of the automobile, with its operating mechanism and a diagram of the electric circuits in connection therewith. Fig. 2 is an enlarged sectional elevation of one of the selecting devices forming part of the improvements. Fig. 3 is a partial plan view showing the shiftable rod and one of the selecting devices in shifted position to mesh the gears. Fig. 4 is a cross sectional view of one of the switches, taken on the line x—x of Fig. 5. Fig. 5 is a plan view of the mechanism shown in Fig. 4.

A drive shaft 1, driven by the automobile engine not shown, is mounted in bearing 2 of a gear casing 3 and a rear shaft $1^a$ is mounted in a direct axial line with shaft 1 and may be normally rotated independently therefrom. Said rear shaft may be rotated directly by and with the front shaft by means of a clutch member 4 splined on the front shaft 1 being shifted to engage a coöperating clutch member 5 fixed upon the rear shaft $1^a$.

The shaft 1 carries drive gears 6, 7, 8 of different diameters fixed thereon, and transmission gears 9, 10, 11 coöperating respectively with said gears are splined upon a rotatable shaft 12 mounted in bearings 13 of the casing 3. Shifting any one of the gears 9, 10 or 11 into mesh with its coöperating drive gear rotates the countershaft 12 at a speed corresponding to the ratio of the meshing gears, which speed is imparted to the rear shaft $1^a$, that drives the automobile wheels, by means of a gear 14 on shaft 12 meshing with a gear 15 fixed on shaft $1^a$. Meshing the gears 9 and 6 thus imparts a low speed to the automobile wheels, meshing gears 10 and 7 imparts a higher speed to said wheels, clutching the shaft 1 to its rear part $1^a$ drives the latter direct at a still higher speed, and meshing the gears 11 and 8 imparts to the automobile the highest speed relative to that of its engine. To reverse the automobile wheels gears 9 and 6 are meshed, and gear 14 is shifted to unmesh from gear 15 and a gear 16 rigid therewith is thereby shifted to mesh with a gear 17, running on a stud 18, which in turn meshes with a gear 19 fixed on shaft $1^a$, whereby this shaft is rotated in an opposite direction to the drive shaft 1.

Each bearing sleeve 20 of gears 9, 10, 11, 14, and of clutch 4 is embraced by the forked extremity 21 of an arm 22 which has a hub 23 at its other extremity slidable on a cylindrical guide-rod 24, secured at its ends 25 to casing 3, so that shifting either of said hubs 23 to the right and to the left, as viewed in Fig. 1, will cause the gear connected thereto to mesh with and unmesh from its coöperating gear on drive shaft 1, as shown by the dot and dash lines. On the hubs 23 are fixed selecting devices 26, 27, 28, 29, and 30, Figs. 1 and 2, the object of which will be seen later, by their webs 31 forming part of said hubs.

A bar or support 32 is fixed at its extremities 33 to casing 3 and is disposed parallelly to guide-rod 24 and adjacent said selecting devices. Underneath the support 32 is seated a shiftable rod 34, the side of which has a rib 35, Fig. 2, and is slidable in a longitudinal L-shaped channel 36 provided in said support. In the support 32, opposite the longitudinal center line of each selecting device, is provided a notch 37, and in the shiftable rod 34 are provided similar notches 38 which register with the notches 37 when said rod is in the normal position shown in Fig. 1. Each selecting device has a solenoid 39 and a solenoid-core 40 which is provided with a tongue 41 that is slidable upwardly and downwardly within a flat recess 42 formed in the web 31. Normally, the tongue 41 is seated within the notch 37 opposite thereto, Fig. 2, and is held in this position by a spring 43 upholding the core 40 as shown, so that the selecting device and arm 22 dependent therewith are firmly held against shifting, and the transmission gear carried by said arm is maintained out of mesh. When the solenoid 39 is energized, the core 40 is drawn in, by its head 44 being attracted contrary to the pressure of said spring, and the tongue 41 is thereby forced downwardly, to the position shown by the dot and dash lines, out of engagement with the support-notch 37 and within the notch 38 of the rod 34. If said rod is now shifted to the right as viewed in Figs. 1, 3 said device and parts dependent therewith are carried along and the gear carried by the arm 22 is shifted into mesh with its coöperating drive gear.

The rod 34 is shifted by a compressed air cylinder 45 and piston 46, the piston-rod 47 of which is fixed to or forms part of said rod. The stroke of the piston 46 is equal to the shifting distance required by the gears when meshing and unmeshing. Compressed air is admitted through a pipe 48 into the chest 49, and when the valve 50 is placed in the position shown the air passes into the cylinder through port 51 and moves the piston to the position shown, while the air on the opposite side of the piston is exhausted through the port 52 and the exhaust opening 53 in chest 49. When the valve 50 is reversed to the position shown by the dot and dash lines the exhaust opening 53 is closed and air is admitted through port 52, which moves the piston 46 to its opposite position shown by the dot and dash lines, while the air on the opposite side of the piston is exhausted through the port 51 and exhaust opening 54. This movement of the piston shifts the rod 34 to the right, Fig. 3, and whichever one of the selecting devices is in engagement therewith is thereby carried along and its dependent gear caused to mesh with its coöperating drive gear.

Circuits for operating the transmission mechanism are controlled by switches 55, 56, 57, 58, and 59, Figs. 1, 4, and 5. Each switch comprises a barrel 60 rotatably mounted on a fixed rod 61, within a casing 62, and has a handle 63 which is fixed centrally upon its periphery and protrudes through a slot 64 formed in said casing. The barrel 60 is normally held in the same relative position and the handle 63 maintained midway in its slot 64, by means of springs 65 fixed to rod 61 within recesses 66 in each end of the barrel pressing oppositely against pins 67 fixed to the barrel, so that when said handle is swung and the barrel rocked to the right or to the left, Fig. 4, limited in either direction by the extremities 64ᵃ of said slot, it is automatically restored to normal midway position upon being released. A conducting plate 68 of required shape is inlaid on the periphery of barrel 60, and terminal shoes 69 are in pressed contact with said periphery, whereby when said handle is swung and the barrel turned in operating the switch said shoes are caused to contact with and to come off said plate and to make and break the circuits.

In Fig. 1 the transmission gears are all shown out of mesh and the shafts 1 and 1ᵃ unclutched, in which case the automobile is at rest or moves only by its momentum. When it is desired to drive the wheels by the engine at a predetermined speed relative to the engine speed the required pair of coöperating gears are meshed by turning a corresponding switch.

Assuming that it is desired to mesh gears 10 and 7 the switch 56 is turned to the right, as viewed in the drawing, and released. This conducts the current from battery 70 along wire 71, shoe 69ᵃ, plate 68 of switch 55, shoe 69ᵇ, wire 72, shoe 69ᶜ, plate 68 of switch 56, shoe 69ᵈ, along wires 73, 73ᵃ, and energizes the solenoid 39 of the device 27. The tongue 41 of this device is thereby caused to engage the shiftable rod 34, while the head 44 of core 40 being magnetized attracts an iron plate 74, forming part of a stem 75 held concentrically with core 40 in a guiding hub 76 of cap 77 secured to the cylinder 78 surrounding the solenoid; and said plate and stem being drawn downwardly contrary to the pull of a spring 79 to the position shown by the dot and dash lines, causes a conducting cross-bar 80 on the stem to contact with opposite terminal bars 81 fixed in the walls of the cylinder 78 and insulated therefrom. This conducts the current from the battery along the wires 71, 82, through a solenoid 83, wires 84, 85, terminals 81, bar 80, and wires 86, 73ᵃ, and energizing the solenoid 83 causes it to move the valve 50, the stem 50ᵃ of which forms part of the solenoid core 83ᵃ, to the position shown by the dot and dash lines, whereby the piston 46 is reversed and the gears 10 and 7 meshed. When the valve 50 is thus set a latch 87, hinged to a link 88 which is pressed against by a flat spring 89, is caused to enter a notch 90 formed in the valve stem 50ᵃ, and said latch thereby maintains the valve 50 and cylinder 46 in position to hold the gears 10, 7 meshed. Upon the switch 56 being released, the solenoid 39 deënergized, and the core-head 44 demagnetized the cross-bar 80 is withdrawn by the pull of its spring 79 to the position shown, the solenoid 83 deënergized, and no current is therefore consumed while the gears are maintained meshed.

To unmesh the gears 10, 7, for stopping the automobile or before meshing a different pair of gears, the switch 56 or any one of the other switches is turned to the left and released. This contacts plate 68 with the shoe 69<sup>e</sup> and conducts the current along wires 91, 92 and energizes a magnet 93, whereby it attracts the link 88, which is its armature, contrary to the pressure of spring 89 and forces the latch 87 out of the notch 90; whereupon the valve 50 is reversed, by a contracting spring 94 fixed to the solenoid and to core 83<sup>a</sup> pulling on said core and stem 50<sup>a</sup>, and the piston 46 being reversed to the position shown the gears 10, 7 are unmeshed. The selecting device 27 being thus returned to normal position, its tongue 41 at once enters the notch 37 and the device and depending gear 10 are restored into engagement with the support 32.

By following the circuits leading from the switches 55 57, and 58 in the dr wing, it will be seen that the operation of these switches actuates the devices 26, 2 and 29 respectively and also the shifting mechanism for the rod 34 to mesh and unmesh the coöperating gears 9 and 6, 11 and 8, and the clutch members 4, 5 respectively, in the same manner as described above with respect to the gears 10, 7.

In practice when it is desired to mesh a pair of gears and obtain a desired speed the switch corresponding thereto is first turned to the left, to unmesh whatever other gears may happen to be in mesh, and then to the right to mesh the desired gears.

When it is desired to reverse the wheels to move the automobile backward the switch 59 is turned to the right. This contacts the conducting plate 68 of this switch first with the shoe 69<sup>f</sup> and then with the shoe 69<sup>g</sup>, and in the first instance conducts the current from wire 71, through the plates 68 of the other switches which are connected in series by shoes 69 and wires 72, 72<sup>a</sup>, and along shoe 69<sup>f</sup>, wires 95, 73<sup>a</sup> and energizes the solenoid 39 of the device 30, causing its tongue 41 to engage the shiftable rod 34. In the second instance the current is conducted from said plate 68 and shoe 69<sup>g</sup> along wires 96, 97, 73<sup>a</sup>, and causes the device 26 to engage the rod 34, and, the cross bar 80 of this device closing the circuit which energizes the solenoid 83, the rod 34 is shifted and the gears 9 and 6 meshed. The device 30 being likewise carried along by the rod 34 the gear 14 dependent therewith is unmeshed from the gear 15 and the gears 16, 17 meshed, whereby the gears 6, 9 driving the countershaft 12 transmit a low speed reverse rotation through gears 16, 17, 19 to the rear shaft 1<sup>a</sup> and to the automobile wheels. Turning the switch 59 to the left shifts back the devices 26, 30 to the left, and restores the gears 9, 14, 16 to the position shown and the gear 14 into mesh with the gear 15.

It will be seen that when the bar 34 engages a selecting device and shifts it to mesh a pair of gears all the notches 38 are disposed out of their normal alinement with the notches 37, Fig. 3, whereby movement of the tongue 41 of any one of the remaining devices is prevented, and each of said devices is thereby rendered inoperative if its corresponding switch should be accidentally turned to the right. It will be noted that the switches are connected in series, and that the corresponding shoe 69<sup>h</sup> in each, as indicated on switch 56, is out of contact with plate 68 when the switch is rotated to the right. This breaks the circuit of the adjacent switch farthest from the battery, so that if two switches should be accidentally turned at once only one would take effect and mesh its corresponding gears. While one of the selecting devices is shifting and the cross bar 80 and plate 74 are in withdrawn position the large gap between the plate and the core head 44, which is held down by bar 32, would prevent said plate being attracted and prevent the solenoid 83 being energized if the switch of this selecting device should be accidentally turned on. All these provisions preclude accidental meshing of two pairs of coöperating gears at the same time and are conducive to reliability and accuracy of operation of the transmission.

Variations may be resorted to within the scope of the invention, and portions of the improvements may be used without others.

Having thus described my invention, I claim:—

1. In an automobile, the combination with drive gears, and a transmission gear for each of said drive gears adaptable to mesh therewith and unmesh therefrom, of a circuit, a circuit closer for each coöperating pair of said gears connected in series in said circuit, a selecting device for each coöperating pair of said gears, mechanism for meshing the gears, branch circuits operating said devices, and said devices and mechanism being actuated to select and mesh any coöperating pair of said gears by making and breaking of said circuits with said circuit closers.

2. In an automobile, the combination with drive gears, and a transmission gear for each of said drive gears adaptable to mesh therewith and unmesh therefrom, of a main circuit, a selecting device for each coöperating pair of said gears, a branch circuit for each of said devices, a closer for each of said branch circuits connected in series in said main circuit, each of said circuit closers when closed adaptable to break the branch circuit of its adjacent closer, and means to select and mesh any coöperating pair of said gears by closing said circuits.

3. In an automobile, the combination with drive gears, and a transmission gear for each of said drive gears adaptable to mesh therewith and unmesh therefrom, of a main circuit, means to mesh and unmesh any coöperating pair of said gears, branch circuits having means for operating said means, and a circuit closer for each of said branch circuits connected in series in said main circuit and adaptable to break the other branch circuits when one of said branch circuits is closed.

4. In an automobile, the combination with drive gears, and a transmission gear for each of said drive gears adaptable to mesh therewith and unmesh therefrom, of means to mesh and unmesh any coöperating pair of said gears, a circuit for each coöperating pair of said gears having means for operating said means, and a circuit closer for each circuit adaptable to break the other circuits when one of said circuits is closed.

5. In an automobile, the combination with drive gears, and a transmission gear for each of said drive gears adaptable to mesh therewith and unmesh therefrom, of a selecting device for each coöperating pair of said gears, a shiftable rod, means to connect any one of said devices to said rod, and means to shift said rod and connected device to mesh and unmesh its coöperating pair of gears.

6. In an automobile, the combination with drive gears, and a transmission gear for each of said drive gears adaptable to mesh therewith and unmesh therefrom, of a shiftable rod, an arm extending from each coöperating pair of gears to said rod, means to connect any one of said arms to said rod, and means to shift said rod and connected arm to mesh and unmesh its coöperating pair of gears.

7. In an automobile, the combination with drive gears, and a transmission gear for each of said drive gears adaptable to mesh therewith and unmesh therefrom, of a shiftable rod, a fixed support, an arm extending from each coöperating pair of said gears to said rod, a selecting device on each of said arms normally engaging said support, means to disengage any one of said devices from said support and connect it to said rod, and means to shift said rod and connected device to mesh and unmesh its coöperating pair of gears.

8. In an automobile, the combination with drive gears, and a transmission gear for each of said drive gears adaptable to mesh therewith and unmesh therefrom, of a shiftable rod, a fixed support, an arm extending from each coöperating pair of said gears to said rod, said arms being normally locked to said support, means to disengage any one of said arms from said support and connect it to said rod, and means to shift said rod and connected arm to mesh and unmesh its coöperating gears.

9. In an automobile, the combination with drive gears, and a transmission gear for each of said drive gears adaptable to mesh therewith and unmesh therefrom, of a shiftable rod, a fixed support, a gear of each coöperating pair of said gears normally engaging said support, means to disengage any one of said gears from said support and connect it to said rod, and means to shift said rod and connected gear to mesh it with and unmesh it from its coöperating gear.

10. In an automobile, the combination with drive gears, and a transmission gear for each of said drive gears adaptable to mesh therewith and unmesh therefrom, of a shiftable rod, a fixed rod, an arm extending from each coöperating pair of said gears to said rods, said rods having notches, a selecting device on each of said arms normally engaging the notches of said fixed rod, means to disengage any one of said devices from the notch in said fixed rod and connect it to a notch of said shiftable rod, and means to shift the latter rod and connected device to mesh and unmesh its coöperating pair of gears.

11. In an automobile, the combination with drive gears, and a transmission gear for each of said drive gears adaptable to mesh therewith and unmesh therefrom, of a selecting device for each coöperating pair of said gears, a shiftable rod, means to connect any one of said devices to said rod, an air cylinder and piston for shifting said rod and connected device to mesh and unmesh its coöperating pair of gears, an air valve for said cylinder, a circuit having means to operate said valve, and said circuit being closed when said device is connected to said rod to operate said cylinder and piston to shift said rod.

12. In an automobile, the combination with drive gears, and a transmission gear for each of said drive gears adaptable to mesh therewith and unmesh therefrom, of a selecting device for each coöperating pair of said gears, a shiftable rod, means to connect any one of said devices to said rod, an air cylinder and piston for shifting said rod and connected device to mesh and unmesh its coöperating pair of gears, an air valve for said cylinder, a circuit having means to set said valve, said circuit being closed when said device is connected to said rod to set said valve and operate said cylinder and piston to shift said rod, and means to maintain said valve set to maintain said coöperating pair of gears in mesh when said circuit is broken.

13. In an automobile, the combination with drive gears, and a transmission gear for each of said drive gears adaptable to mesh therewith and unmesh therefrom, of a selecting device for each coöperating pair of said gears, a shiftable rod, means to connect any one of said devices to said rod, an air cylinder and piston for shifting said rod and connected device to mesh and unmesh its coöperating pair of gears, an air valve for said cylinder, a circuit having means to set said valve, said circuit being closed when said device is connected to said rod to set said valve and operate said cylinder and piston to shift said rod, means to maintain said valve set to maintain said coöperating pair of gears in mesh when said circuit is broken, and means to reverse said valve and the operation of said cylinder and piston for unmeshing said coöperating pair of gears.

14. In an automobile, the combination with drive gears, and a transmission gear for each of said drive gears adaptable to mesh therewith and unmesh therefrom, of a selecting device for each coöperating pair of said gears, a shiftable rod, means to connect any one of said devices to said rod, an air cylinder and piston for shifting said rod and connected device to mesh and unmesh its coöperating pair of gears, an air valve for said cylinder, a circuit having means to set said valve, said circuit being closed when said device is connected to said rod to set said valve and operate said cylinder and piston to shift said rod, spring-pressed means engaging said valve to hold it set and maintain said coöperating gears in mesh when said circuit is broken, and a circuit having means to release said spring-pressed means to reverse said valve and the operation of said cylinder and piston for unmeshing said coöperating pair of gears.

15. In an automobile, the combination with drive gears, and a transmission gear for each of said drive gears adaptable to mesh therewith and unmesh therefrom, of an air cylinder, an air valve, a piston, a piston rod, means to connect a gear of any coöperating pair of said gears to said piston rod, and said valve being set when said gear is connected to operate said cylinder and piston to mesh said gear with its coöperating gear.

16. In an automobile, the combination with drive gears, and a transmission gear for each of said drive gears adaptable to mesh therewith and unmesh therefrom, of an air cylinder, a piston, a piston rod, an air valve for said cylinder, means to connect a gear of any coöperating pair of said gears to said piston rod, a circuit having means to set the valve of said cylinder, and said circuit being closed by said gear connecting means to operate said cylinder and piston to mesh said gear with its coöperating gear.

17. In an automobile, the combination with drive gears, and a transmission gear for each of said drive gears adaptable to mesh therewith and unmesh therefrom, of a selecting device for each coöperating pair of said gears, a shiftable rod, means to connect any one of said devices to said rod, an air cylinder and piston for shifting said rod and connected device to mesh and unmesh its coöperating pair of gears, an air valve for said cylinder, a circuit having means to set said valve, and said circuit being closed when said device is connected to said rod to set said valve and operate said cylinder and piston to shift said rod.

18. In an automobile, the combination with drive gears, and a transmission gear for each of said drive gears adaptable to mesh therewith and unmesh therefrom, of an air cylinder, an air valve, a piston, a piston rod, means to connect a gear of any coöperating pair of said gears to the piston rod, a circuit having means to set said valve, said circuit being closed by said gear connecting means to operate the cylinder and piston to mesh the gear with its coöperating gear, and means to maintain said valve set to maintain said coöperating gears in mesh when said circuit is broken.

19. In an automobile, the combination with drive gears, and a transmission gear for each of said drive gears adaptable to mesh therewith and unmesh therefrom, of an air cylinder, an air valve, a piston, a piston rod, means to connect a gear of any coöperating pair of said gears to the piston rod, a circuit having means to set said valve, said circuit being closed by said gear connecting means to operate the cylinder and piston to mesh the gear with its coöperating gear, means to maintain said valve set to maintain said coöperating gears in mesh when said circuit is broken, and a circuit having means to release said maintaining means to reverse said valve and the operation of said cylinder and piston to unmesh said coöperating pair of gears.

20. In an automobile, the combination with drive gears, and a transmission gear for each of said drive gears adaptable to mesh therewith and unmesh therefrom, of a shiftable rod, an arm extending from each coöperating pair of said gears to said rod, a selecting device for each arm to connect it to said rod, said device including a solenoid, and a tongue actuated when said solenoid is energized to engage said rod to said arm, and means to shift said rod and connected arm to mesh and unmesh its coöperating pair of gears.

21. In an automobile, the combination with drive gears, and a transmission gear for each of said drive gears adaptable to mesh therewith and unmesh therefrom, of a shiftable rod, an arm extending from each coöperating pair of said gears to said rod, a selecting device for each arm to connect it to said rod, said device including a solenoid, a tongue actuated when said solenoid is energized to engage said rod to said arm, means to shift said rod and connected arm to mesh and unmesh its coöperating pair of gears, a circuit having means to operate said shifting means, and a circuit closer actuated by said solenoid to close said circuit.

22. In an automobile, the combination with drive gears, and a transmission gear for each of said drive gears adaptable to mesh therewith and unmesh therefrom, of a shiftable rod, an arm extending from each coöperating pair of said gears to said rod, a selecting device for each arm to connect it to said rod, means to shift said rod and arm to mesh and unmesh its coöperating pair of gears, and a circuit having means to operate said shifting means, said selecting device including a solenoid, a tongue actuated by said solenoid when energized to engage said rod, and a circuit closer attracted by the core of said solenoid being actuated thereby to close said circuit to mesh said gears.

23. In an automobile, the combination with drive gears, and a transmission gear for each of said drive gears adaptable to mesh therewith and unmesh therefrom, of a shiftable rod, an arm extending from each coöperating pair of said gears to said rod, a selecting device for each arm to connect it to said rod, means to shift said rod and arm to mesh and unmesh its coöperating pair of gears, and a circuit having means to operate said shifting means, said selecting device including a solenoid, a tongue actuated by said solenoid when energized to engage said rod, a circuit closer attracted by the core of said solenoid being actuated thereby to close said circuit to mesh said gears, and a spring withdrawing said circuit closer and breaking said circuit when said solenoid is deenergized.

24. In an automobile, the combination with drive gears, and a transmission gear for each of said drive gears adaptable to mesh therewith and unmesh therefrom, of a shiftable rod, a fixed support, an arm extending from each coöperating pair of said gears to said support, a selecting device for each of said arms, tongues on said devices normally engaging said support, each of said devices having a solenoid, any one of said solenoids being adapted to be energized to disengage the tongue of its device from said support and engage it with said rod, mechanism to shift said rod and engaging device to mesh its coöperating gears, a circuit having means to operate said mechanism, a circuit closer attracted by the core of said solenoid to close said circuit, said support maintaining said tongue in engagement with said rod when said solenoid is deenergized, and a spring withdrawing said closer to break said circuit, the distance between said closer and solenoid core when withdrawn preventing closing of said circuit if said solenoid is accidentally energized.

25. In an automobile, the combination with drive gears, and a transmission gear for each of said drive gears adaptable to mesh therewith and unmesh therefrom, of a shiftable rod, a fixed support, a selecting device normally engaging a gear of each coöperating pair of said gears with said support, each of said devices having a solenoid, any one of said solenoids being adapted to be energized to disengage its device from said support and engage it with said rod, mechanism to shift said rod and engaging device to mesh its coöperating gears, a circuit having means to operate said mechanism, a circuit closer attracted by the core of said solenoid to close said circuit, said support maintaining said core within its solenoid when it is deënergized, and means to withdraw said closer to break said circuit.

26. In an automobile, the combination with drive gears, and a transmission gear for each of said drive gears adaptable to mesh therewith and unmesh therefrom, of a shiftable rod, a fixed support, a selecting device normally engaging a gear of each coöperating pair of said gears with said support, each of said devices having a solenoid, any one of said solenoids being adapted to be energized to disengage its device from said support and engage it with said rod, mechanism to shift said rod and engaging device to mesh its coöperating gears, a circuit having means to operate said mechanism, a circuit closer attracted by the core of said solenoid to close said circuit, said support maintaining said core within its solenoid when it is deënergized, and means to withdraw said closer to break said circuit, the distance between said closer and solenoid core when withdrawn preventing closing of said circuit if said solenoid is accidentally energized.

27. In an automobile, the combination with drive gears, and a transmission gear for each of said drive gears adaptable to mesh therewith and unmesh therefrom, of a shiftable rod, a fixed support, a selecting device normally engaging a gear of each coöperating pair of said gears with said support, each of said devices having a solenoid, any one of said solenoids being adapted to be energized to disengage its device from said support and engage it with said rod, and mechanism to shift said rod and engaging device to mesh its coöperating gears, said rod when shifted rendering each of said devices inoperative if its solenoid is accidentally energized.

28. In an automobile, the combination with drive gears, and a transmission gear for each of said drive gears adaptable to mesh therewith and unmesh therefrom, of a shiftable rod, a fixed support, a selecting device normally engaging a gear of each coöperating pair of said gears with said support, each of said devices having a solenoid, any one of said solenoids being adapted to be energized to disengage its device from said support and engage it with said rod, mechanism to shift said rod and engaging device to mesh its coöperating gears, a circuit having means to operate said mechanism, and said rod when in shifted position rendering each of said devices inoperative if its solenoid is accidentally energized and preventing closing of said circuit.

29. In an automobile, the combination with drive gears, and a transmission gear for each of said drive gears adaptable to mesh therewith and unmesh therefrom, of a shiftable rod, a fixed support, selecting devices normally engaging a gear of each coöperating pair of said gears with said support, each of said devices having a solenoid, a main circuit, a branch circuit for each of said solenoids, a circuit closer for each of said branch circuits connected in series in said main circuit, each of said branch circuits adaptable to break the other branch circuits when one of said branch circuits is closed, any one of said solenoids being adapted to be energized to disengage its device from said support and engage it with said rod, an air cylinder and piston to shift said rod and engaging device to mesh its coöperating gears, an air valve for said cylinder, a circuit having means to set said valve to operate said cylinder and piston to shift said rod, a circuit closer actuated by said solenoid to close the latter circuit, means to maintain said valve set to hold said rod shifted when said latter circuit is broken, and a circuit releasing said maintaining means to reverse the operation of said cylinder and piston to unmesh said gears.

30. In an automobile, the combination with drive gears, and coöperating gears meshing and unmeshing therewith to transmit speed varying motion to the automobile, of a shiftable rod, a fixed support, selecting devices normally engaging a gear of each coöperating pair of said gears with said support, a circuit, a branch circuit for each of said devices having means to operate it, a circuit closer for each of said branch circuits connected in series in said circuit, each of said closers adaptable to break the other branch circuits when one of said branch circuits is closed to disengage its device from said support and engage it with said rod, mechanism to shift said rod and engaging device to mesh its coöperating gears, a circuit having means to operate said mechanism, said latter circuit adapted to be closed by said energized branch circuit, means to maintain said mechanism to hold said rod shifted when said circuit is broken, and a circuit having means to release said maintaining means to reverse said mechanism and unmesh said coöperating pair of gears.

31. In an automobile, the combination with drive gears, and a transmission gear for each of said drive gears adaptable to mesh therewith and unmesh therefrom, of a shiftable rod, selecting devices adjacent said rod connected to a gear of each coöperating pair of said gears, a circuit for each of said devices having means to operate it, each of said circuits when closed having means to break the other circuits, any one of said circuits adapted to be closed to engage its device with said rod, mechanism to shift said rod and engaging device to mesh its coöperating gears, a circuit having means to operate said mechanism, and said mechanism circuit closed by said closed device circuit.

32. In an automobile, the combination with drive gears, and a transmission gear for each of said drive gears adaptable to mesh therewith and unmesh therefrom, of a shiftable rod, selecting devices connected to a gear of each coöperating pair of said gears, a circuit for each of said devices having means to operate it, any one of said circuits adapted to be closed to engage its device with said rod, mechanism to shift said rod and engaging device to mesh its coöperating gears, a circuit having means to operate said mechanism, and said mechanism circuit closed by said closed device circuit.

33. In an automobile, the combination with drive gears, and a transmission gear for each of said drive gears adaptable to mesh therewith and unmesh therefrom, of a shiftable rod, selecting devices connected to a gear of each coöperating pair of said gears, a circuit for each of said devices having means to operate it, any one of said circuits adapted to be closed to engage its device with said rod, mechanism to shift said rod and engaging device to mesh its coöperating gears, a circuit having means to operate said mechanism, said mechanism circuit closed by said closed device circuit, and means to render said remaining devices inoperative when one of said devices is shifted.

34. In an automobile, the combination with drive gears, and a transmission gear for each of said drive gears adaptable to mesh therewith and unmesh therefrom, of a selecting device connected to a gear of each coöperating pair of said gears, a circuit for each of said devices having means to operate it, mechanism for shifting the devices to mesh the coöperating gears, any one of said circuits adapted to be closed to engage its device with said mechanism, a circuit having means to operate said mechanism, and said mechanism circuit closed by said closed device circuit to shift said engaging device to mesh its gears.

35. In an automobile, the combination with drive gears, and a transmission gear for each of said drive gears adaptable to mesh therewith and unmesh therefrom, of a selecting device connected to a gear of each coöperating pair of said gears, a circuit for each of said devices having means to operate it, mechanism for shifting the devices to mesh the coöperating gears, any one of said circuits adapted to be closed to engage its device with the mechanism, a circuit having means to operate said mechanism, said mechanism circuit closed by said closed device circuit to shift said engaging device to mesh its gears, and means to render said remaining devices inoperative when one of said devices is shifted.

36. In an automobile, the combination with drive gears, and a transmission gear for each of said drive gears adaptable to mesh therewith and unmesh therefrom, of a selecting device connected to a gear of each coöperating pair of said gears, a circuit for each of said devices having means to operate it, mechanism for shifting the devices for meshing the coöperating gears, any one of said circuits adapted to be closed to engage its device with said mechanism, and means to operate said mechanism when said circuit is closed to shift said engaging device to mesh its respective coöperating gears.

37. In an automobile, the combination with drive gears, and a transmission gear for each of said drive gears adaptable to mesh therewith and unmesh therefrom, of a selecting device connected to a gear of each coöperating pair of said gears, a circuit for each of said devices having means to operate it, mechanism for shifting the devices to mesh the coöperating gears, any one of said circuits adapted to be closed to engage its device with said mechanism, means to operate said mechanism when said circuit is closed to shift said engaging device to mesh its gears, and means to render said remaining devices inoperative when one of said devices is shifted.

38. In an automobile, the combination with drive gears, and a transmission gear for each of said drive gears adaptable to mesh therewith and unmesh therefrom, of a selecting device connected to a gear of each coöperating pair of said gears, a circuit for each of said devices having means to operate it, mechanism for shifting the devices for meshing the coöperating gears, two of said circuits adapted to be closed simultaneously to engage their devices with said mechanism, and means to operate said mechanism when said circuit is closed to shift said engaging devices to mesh their respective coöperating gears and reverse said drive gears.

39. In an automobile, the combination with drive gears, and a transmission gear for each of said drive gears adaptable to mesh therewith and unmesh therefrom, of a selecting device for each coöperating pair of said gears, a shiftable rod, means to connect two of said devices to said rod, and means to shift said rod and connected devices to mesh and unmesh its coöperating gears and reverse said drive gears.

40. In an automobile, the combination with drive gears, and a transmission gear for each of said drive gears adaptable to mesh therewith and unmesh therefrom, of a shiftable rod, an arm extending from each coöperating pair of said gears to said rod, means to connect two of said arms to said rod, and means to shift said rod and connected arms to mesh and unmesh its gears and reverse said drive gears.

41. In an automobile, the combination with drive gears, and a transmission gear for each of said drive gears adaptable to mesh therewith and unmesh therefrom, of a selecting device for each coöperating pair of said gears, a shiftable rod, means to connect any one of said devices to said rod, means to shift said rod and connected device to mesh and unmesh its gears, and means to render said remaining devices inoperative when any one of the devices is shifted.

42. In an automobile, the combination with drive gears, and a transmission gear for each of said drive gears adaptable to mesh therewith and unmesh therefrom, of an air cylinder, an air valve, a piston, a piston rod, means to connect a gear of any coöperating pair of said gears to said piston rod, and said means setting said valve to operate the cylinder and piston to mesh the gear with its coöperating gear.

43. In an automobile, the combination with drive gears, of a transmission gear for each of said drive gears adaptable to mesh therewith and unmesh therefrom, of a selecting device for each coöperating pair of said gears, a circuit for each of said devices having means to operate it, mechanism for shifting the devices to mesh the coöperating gears, any one of said circuits adapted to be closed to engage its device with said mechanism, a circuit having means to operate said mechanism, and said mechanism circuit adapted to be closed to shift said engaging device to mesh its coöperating gears.

44. In an automobile, the combination with drive gears, and a transmission gear for each of said drive gears adaptable to mesh therewith and unmesh therefrom, of a selecting device for each coöperating pair of said gears, a circuit for each of said devices having means to operate it, mechanism for shifting the devices to mesh the coöperating gears, any one of said circuits adapted to be closed to actuate its device to connect a gear of its coöperating pair of gears with said mechanism, and means to operate said mechanism when said circuit is closed to mesh the coöperating gears.

Signed at the city of New York, in the county of New York, and State of New York, this 2nd day of July, A. D. 1913.

MERION J. HUGGINS.

Witnesses:
 CHAS. U. LeRUE,
 B. ROMAN.